(12) United States Patent
Zhang et al.

(10) Patent No.: US 12,300,829 B2
(45) Date of Patent: May 13, 2025

(54) BATTERY, BATTERY ASSEMBLY, POWER CONSUMPTION DEVICE, PRODUCING METHOD AND APPARATUS OF BATTERY

(71) Applicant: CONTEMPORARY AMPEREX TECHNOLOGY (HONG KONG) LIMITED, Hong Kong (CN)

(72) Inventors: Wenhui Zhang, Ningde (CN); Kangyu Wang, Ningde (CN); Zhenxing Chen, Ningde (CN); Juanxia Lv, Ningde (CN); Mu Qian, Ningde (CN); Zengzhong Wang, Ningde (CN); Jinqing Ji, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 621 days.

(21) Appl. No.: 17/564,428

(22) Filed: Dec. 29, 2021

(65) Prior Publication Data

US 2022/0123394 A1 Apr. 21, 2022

Related U.S. Application Data

(63) Continuation of application No. PCT/CN2020/119725, filed on Sep. 30, 2020.

(51) Int. Cl.
*H01M 50/176* (2021.01)
*H01M 50/186* (2021.01)
*H01R 13/631* (2006.01)

(52) U.S. Cl.
CPC ....... *H01M 50/176* (2021.01); *H01M 50/186* (2021.01); *H01R 13/631* (2013.01); *H01M 2220/20* (2013.01); *H01R 2201/26* (2013.01)

(58) Field of Classification Search
CPC ........... H01M 2220/20; H01M 50/176; H01M 50/186; H01M 50/204; H01M 50/296;
(Continued)

(56) References Cited

U.S. PATENT DOCUMENTS

| 10,644,299 B2 | 5/2020 | Lee et al. |
| 2004/0152365 A1 | 8/2004 | Ebine |

(Continued)

FOREIGN PATENT DOCUMENTS

| CN | 105957991 A | 9/2016 |
| CN | 107836048 A | 3/2018 |

(Continued)

OTHER PUBLICATIONS

Machine translation CN208507766U (Year: 2019).*
Extended European Search Report dated Jul. 8, 2022 received in European Patent Application No. EP 20941517.3.
First Office Action dated Mar. 1, 2023 received in Chinese Patent Application No. CN 202080096563.9.

*Primary Examiner* — Victoria H Lynch
(74) *Attorney, Agent, or Firm* — Scully, Scott, Murphy & Presser, P.C.

(57) ABSTRACT

The present application provides a battery, a battery assembly, a power consumption device, a producing method and apparatus of a battery, and relates to the field of batteries. The battery includes a box, a battery cell disposed in the box, and a first connector electrically connected to the battery cell. An outer surface of the box is provided with a groove, and the first connector is disposed in the groove, so that a second connector of a power consumption device is at least partially located in the groove when butted with the first connector. The groove is configured to set the first connector. When electric energy of the battery cell needs to be output, the second connector on the power consumption device is butted with the first connector at the position of the groove, and the second connector is partially or completely located in the groove.

17 Claims, 7 Drawing Sheets

(58) Field of Classification Search
CPC ............. H01M 50/564; H01R 13/5202; H01R 13/629; H01R 13/631; H01R 13/74; H01R 2201/26; H01R 24/66
See application file for complete search history.

(56) References Cited

U.S. PATENT DOCUMENTS

| | | |
|---|---|---|
| 2005/0162128 A1 | 7/2005 | Ebine et al. |
| 2006/0228937 A1 | 10/2006 | Ebine et al. |
| 2007/0218754 A1 | 9/2007 | Ebine et al. |
| 2009/0068880 A1 | 3/2009 | Ebine |
| 2018/0190965 A1 | 7/2018 | Lee et al. |
| 2020/0119477 A1* | 4/2020 | Kwon ..................... B60L 50/64 |

FOREIGN PATENT DOCUMENTS

| | | | |
|---|---|---|---|
| CN | 208507766 U | 2/2019 | |
| CN | 109888570 A | 6/2019 | |
| CN | 110571381 A | 12/2019 | |
| CN | 210911986 U | 7/2020 | |
| EP | 1411565 A1 | 4/2004 | |
| EP | 3573194 A1 * | 11/2019 | ............. B60L 53/16 |
| KR | 20170095070 A | 8/2017 | |
| KR | 10-2065096 B1 | 1/2020 | |

\* cited by examiner

FIG. 13

BATTERY, BATTERY ASSEMBLY, POWER CONSUMPTION DEVICE, PRODUCING METHOD AND APPARATUS OF BATTERY

CROSS-REFERENCE TO RELATED APPLICATIONS

This application is a continuation of International Application No. PCT/CN2020/119725, filed on Sep. 30, 2020, which is hereby incorporated herein by reference in its entirety.

TECHNICAL FIELD

The present application relates to the field of batteries, and in particular, to a battery, a battery assembly, a power consumption device, a producing method and apparatus of a battery.

BACKGROUND

At present, batteries are indispensable energy supply components on vehicles. For example, vehicle motors and controllers require batteries for power supply. A connector of a battery is butted with a connector of a vehicle body to output electric energy of the battery to the vehicle. The connector of the battery and the connector of the vehicle body occupy a certain amount of space, affecting arrangement of other components of the vehicle.

SUMMARY

Embodiments of the present application provide a battery, a battery assembly, a power consumption device, a producing method and apparatus of a battery to improve the problem of affecting arrangement of other components of a power consumption device due to large space occupation by connectors when a battery is butted with a power consumption device body.

In a first aspect, an embodiment of the present application provides a battery, including a box, a battery cell, and a first connector. The battery cell is disposed in the box. The first connector is electrically connected to the battery cell to output electric energy. An outer surface of the box is provided with a groove, and the first connector is disposed in the groove, so that a second connector of a power consumption device is at least partially located in the groove when butted with the first connector.

In the foregoing technical solution, the groove is configured to set the first connector to avoid the first connector occupying too much space inside the box, and the provision of the groove could also leave butting space for the butting between the first connector and the second connector. When electric energy of the battery cell needs to be output, the second connector on the power consumption device is connected to the first connector at the position of the groove, and the second connector is partially or completely located in the groove, so that the battery is closer to the power consumption device, which could reduce mounting space required for mounting the batter to the power consumption device so that and the structure of the power consumption device is more compact.

In addition, the battery according to the embodiment of the first aspect of the present application further has the following additional technical feature:

In some embodiments of the first aspect of the present application, the first connector is disposed on a bottom wall of the groove.

In the foregoing technical solution, the first connector is disposed on the bottom wall of the groove, so that the first connector is located at the deepest position of the groove. When the second connector is butted with the first connector, the second connector could be located in the groove to the maximum extent, which further reduces the space required for mounting the battery in the power consumption device, so that the structure of the power consumption device equipped with the battery is more compact.

In some embodiments of the first aspect of the present application, a bottom wall of the groove is provided with a first opening, and the first opening is configured for the first connector to pass through to output electric energy of the battery cell to an outside of the box through the first connector.

In the foregoing technical solution, the first connector passes through the first opening to facilitate simultaneous connection to the second connector and the battery cell inside the box, and a portion of the first connector could be accommodated in the box, which reduces the occupation of the first connector in the space of the groove to leave more space for the butting between the second connector and the first connector, so that the second connector is located in the groove as much as possible, and the structures of the battery and the power consumption device after mounting are further more compact.

In some embodiments of the first aspect of the present application, the first connector covers the first opening and is hermetically connected to the box to close the first opening.

In the foregoing technical solution, the first connector covers and seals the first opening, which could prevent rainwater, dust in the air and the like from entering the box through the first opening and damaging components inside the box.

In some embodiments of the first aspect of the present application, the first connector includes a base and a first connecting end, the base covers the first opening from an inner side of the box, a first surface of the base faces the first opening, and the first connecting end is disposed on the first surface and passes out from the first opening.

In the foregoing technical solution, the base covers the first opening from the inner side of the box, which has a sealing effect on the first opening. After the second connector is butted with the first connector, the base can prevent the first connector from moving along a direction approaching the second connector, which avoids the second connector 500 pulling off the first connector 130 which may cause an electrical disconnection between the first connector and the battery cell.

In some embodiments of the first aspect of the present application, the battery further includes: a sealing member, the sealing member being disposed between the first surface and an inner surface of the box, arranged surrounding the first opening, and configured to realize hermetic connection between the first connector and the box.

In the foregoing technical solution, the sealing member is disposed in the box, which could avoid sealing failure caused by external wear, corrosion and the like. In addition, the sealing member is disposed in the box, which avoids the sealing member occupying the space of the groove, so that the groove can leave more space for the butting between the second connector and the first connector. The sealing member has better sealing performance since it is arranged surrounding the first opening.

In some embodiments of the first aspect of the present application, the battery further includes: a fixing member, the fixing member being configured to pass through a first through hole provided on a bottom wall of the groove to be connected to the first connector, so as to fix the first connector to the box.

In the foregoing technical solution, the first connector is fixed to the box through the fixing member, so that the first connector does not move relative to the box, and stable connection relationships between the first connector and the battery cell and between the first connector and the second connector could be maintained.

In some embodiments of the first aspect of the present application, the battery further includes: a reinforcing plate, the reinforcing plate being disposed on a bottom wall of the groove and fixed to the box, and the reinforcing plate being provided with a second opening configured for the first connector to pass through.

In the foregoing technical solution, the provision of the reinforcing plate could not only further improve stability of the connection between the first connector and the box, but also withstand the impact when the second connector on the power consumption device is butted with the first connector. Moreover, the bottom wall of the groove is drilled with the first opening, so that the strength of the bottom of the groove is reduced, thereby reducing bearing capacity of the bottom of the groove. The provision of the reinforcing plate could compensate for the defect of reduction of the bearing capacity caused by drilling the first opening on the bottom wall of the groove.

In some embodiments of the first aspect of the present application, the reinforcing plate is provided with a second through hole, and the fixing member is configured to pass through the second through hole and the first through hole in sequence to be connected to the first connector, so as to fix the reinforcing plate and the first connector to the box.

In the foregoing technical solution, the fixing member fixes the reinforcing plate and the first connector to the box simultaneously, which could reduce the number of fixing member and the weight of the battery, save the costs, and reduce the difficulty of assembly of the battery.

In some embodiments of the first aspect of the present application, the first connector is provided with a first guiding part, and the first guiding part is configured to guide the second connector when the first connector is butted with the second connector, so as to align a position of the second connector with that of the first connector.

In the foregoing technical solution, the provision of the first guiding part could ensure an accurate butting between the first connector and the second connector.

In some embodiments of the first aspect of the present application, the box includes a lower housing and an upper cover body, the battery cell is disposed in the lower housing, the upper cover body covers the lower housing, the groove is provided on the upper cover body, and the groove is recessed downwards from an outer surface of the upper cover body.

In the foregoing technical solution, the box includes the low housing and the upper cover body, which facilitates the mounting of the battery cell and other components in the box, and the box is a split structure, which facilitates manufacturing and molding of the box.

In a second aspect, an embodiment of the present application provides a battery assembly, including a support and a battery provided in the embodiments of the first aspect.

The support is configured to be mounted to a power consumption device body. The battery is mounted to the support.

In the foregoing technical solution, the battery and the power consumption device body are connected through the support, and the support could provide reasonable mounting space for battery mounting.

In some embodiments of the second aspect of the present application, the battery assembly further includes: a second connector, the second connector being mounted to the support, and the second connector being configured to be butted with the first connector of the battery.

In the foregoing technical solution, the second connector is connected to the first connector at the position of the groove, and the second connector is partially or completely located in the groove, which could reduce a distance between the battery and the power consumption device and mounting space required for mounting the battery to the power consumption device, so that the structure of the power consumption device equipped with the battery is more compact.

In some embodiments of the second aspect of the present application, the second connector includes a second connecting end, and the second connecting end is disposed towards the battery along a direction of gravity, so that the first connector is capable of being butted with the second connector along a direction opposite to the direction of gravity.

In the foregoing technical solution, the first connector is butted with the second connector along the direction opposite to gravity, which could make full use of the space of the power consumption device in a direction of gravity, and could reduce the lateral size of the power consumption device.

In some embodiments of the second aspect of the present application, the second connector is floatingly mounted to the support.

In the foregoing technical solution, the second connector is floatingly mounted to the support, so that the case where the first connector and the second connector cannot be assembled in place caused by manufacturing or mounting errors could be avoided when the first connector and the second connector are butted.

In some embodiments of the second aspect of the present application, the first connector is provided with a first guiding part, the second connector is provided with a second guiding part, and the first guiding part is configured to be mated with the second guiding part when the first connector is butted with the second connector to guide the second connector, so as to align a position of the second connector with that of the first connector.

In the foregoing technical solution, the first connector and the second connector are guided to be butted with each other by mating the first guiding part and the second guiding part, which could improve accuracy of the butting between the first connector and the second connector.

In some embodiments of the second aspect of the present application, one of the first guiding part and the second guiding part is a guiding sleeve, and the other is a guiding pillar.

In the foregoing technical solution, the first connector and the second connector are guided to be butted with each other by the mating of the guiding sleeve and the guiding pillar, which is simple in implementation and high in reliability.

In a third aspect, an embodiment of the present application provides a power consumption device, including: a power consumption device body; and the battery assembly provided in any one of the embodiments of the second aspect, the support of the battery assembly being mounted to the power consumption device body.

In the foregoing technical solution, the power consumption device body and the battery are connected through the support, and the support could provide reasonable mounting space for battery mounting. This structure won't affect the use of the battery or power consumption device when the first connector of the battery is damaged due to the gravity, and also ensures a convenient battery replace or maintenance.

In a fourth aspect, an embodiment of the present application provides a power consumption device, including: a power consumption device body; and a battery provided in any one of the embodiments of the first aspect, the battery being mounted to the power consumption device body.

In the foregoing technical solution, the second connector on the power consumption device is connected to the first connector at the position of the groove, and the second connector is partially or completely located in the groove, which could reduce a distance between the battery and the power consumption device, so that the battery is closer to the power consumption device, and could reduce mounting space required for mounting the battery to the power consumption device, so that the structure of the power consumption device equipped with the battery is more compact.

In a fifth aspect, an embodiment of the present application provides a producing method of a battery, including: providing a battery cell; providing a first connector; providing a box, an outer surface of the box being provided with a groove; disposing the battery cell in the box; disposing the first connector in the groove; and connecting the first connector to the battery cell to output electric energy of the battery.

In a sixth aspect, an embodiment of the present application provides a producing apparatus of a battery, including: a providing module configured to: provide a battery cell; provide a first connector; and provide a box, an outer surface of the box being provided with a groove; and a mounting module configured to: dispose the battery cell in the box; dispose the first connector in the groove; and connect the first connector to the battery cell to output electric energy of the battery.

BRIEF DESCRIPTION OF DRAWINGS

In order to illustrate technical solutions in embodiments of the present application more clearly, brief description will be made below to accompanying drawings required in the embodiments of the present application. Apparently, the accompanying drawings described below are some embodiments of the present application only, and other drawings could be obtained based on these accompanying drawings by those ordinary skilled in this art without creative efforts.

In the accompanying drawings, the accompanying drawings are not drawn to actual scale.

DESCRIPTION OF EMBODIMENTS

Implementation manners of the present application will be further described below in detail with reference to drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise illustrated, "a plurality of" means equal or more than two; and orientations or positional relationships indicated by terms such as "up", "down", "left", "right", "inside", and "outside" are merely for convenience of describing the present application and for simplifying the description, rather than for indicating or implying that an indicated apparatus or element must have a specific orientation, and must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within the allowable range of error. "Parallel" is not strictly parallel, but within the allowable range of error.

The terms representing directions in the following description are all directions shown in the drawings, and do not limit the specific structure of the present application. In the description of the present application, it should be further noted that, unless explicitly specified or defined otherwise, terms "installation", "interconnection" and "connection" should be understood broadly, for example, they may be either a fixed connection, or a detachable connection, or an integrated connection; and they may be either a direct connection, or an indirect connection through an intermediary. Those of ordinary skill in the art may appreciate the specific meanings of the foregoing terms in the present application according to specific conditions.

In the prior art, a battery is provided with a first connector, and a second connector butted with the first connector of the battery is mounted to a power consumption device, so that electric energy of the battery is transferred to a power consumption device body through the first connector and the second connector. After the first connector and the second connector are butted, the first connector and the second connector need to additionally occupy a certain amount of space, so that there is a large distance between the battery and the power consumption device body, which requires large space for mounting the battery in the power consumption device, and is not beneficial to a compact structure of the power consumption device.

Figure 1:
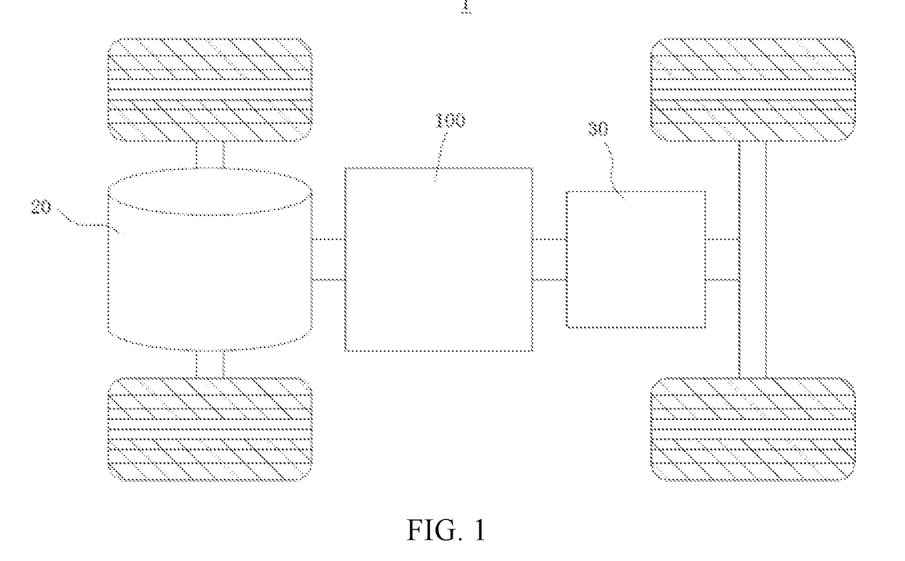
FIG. 1 is a schematic diagram of a power consumption device provided in an embodiment of the present application.

As shown in FIG. 1, an embodiment of the present application provides a power consumption device 1 that uses a battery 100 as a power source. The battery 100 mentioned in the embodiments of the present application refers to a single physical module including one or more battery cells to provide a higher voltage and capacity. For example, the battery mentioned in the present application may include a battery module, a battery pack, or the like. The battery generally includes a box for packaging one or more battery cells. The box can avoid liquid or other foreign matters affecting charge or discharge of the battery cell.

The technical solutions described in the embodiments of the present application are all applicable to various apparatuses using batteries, such as mobile phones, portable devices, notebook computers, electromobiles, electric toys, electric tools, electric vehicles, ships and spacecraft. For example, the spacecraft includes airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

As shown in FIG. 1, FIG. 1 is a schematic structural diagram of a vehicle according to an embodiment of the present application. The vehicle may be a fuel-powered vehicle, a gas-powered vehicle or a new energy vehicle, and the new energy vehicle may be a battery electric vehicle, a hybrid vehicle, an extended-range vehicle, or the like. A motor 20, a controller 30 and a battery 100 may be disposed inside the vehicle, and the controller 30 is configured to control the battery 100 to supply power to the motor 20. For example, the battery 100 may be disposed at the bottom, head or tail of the vehicle. The battery 100 may be configured to supply power to the vehicle. For example, the battery 100 may be used as an operation power source of the vehicle for a circuit system of the vehicle, for example, for a working power demand of the vehicle during startup, navigation and running. In another embodiment of the present application, the battery 100 may be used not only as an operation power source of the vehicle, but also as a driving power source of the vehicle, replacing or partially replacing fuel or natural gas to provide driving power for the vehicle.

The power consumption device 1 includes the power consumption device body and the battery 100, the power consumption device body is a vehicle body, and the battery 100 is mounted to the power consumption device body. The battery 100 includes a box 110, a battery cell 120 and a first connector 130, the battery cell 120 is disposed in the box 110, and the first connector 130 is electrically connected to the battery cell 120 to output electric energy of the battery 100.

In some embodiments, the battery 100 may be directly mounted to the power consumption device body, and the power consumption device body includes a second connector 500. When the first connector 130 is butted with the second connector 500, the electric energy of the battery 100 may be transferred to the power consumption device body through the first connector 130 and the second connector 500.

Figure 2:
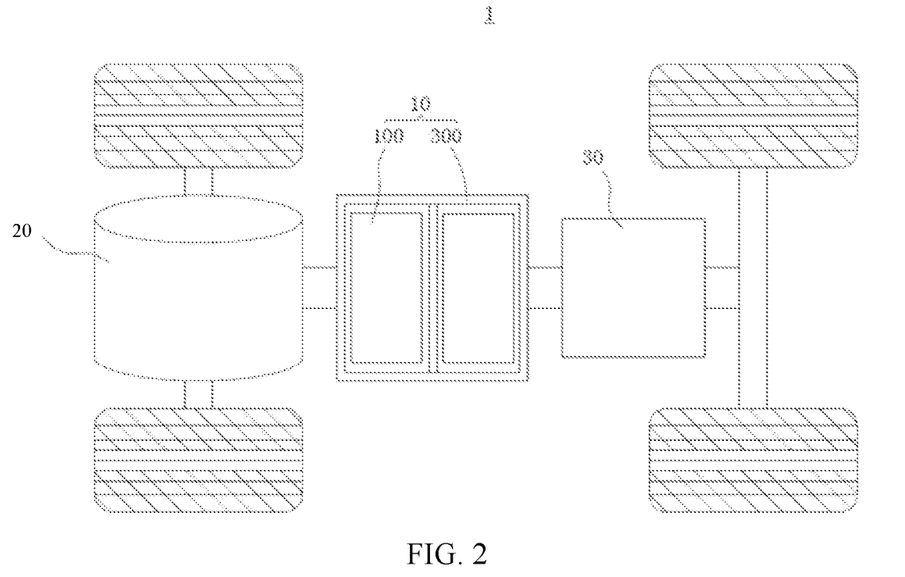
FIG. 2 is a schematic diagram of a power consumption device provided in another embodiment of the present application.
Figure 3:
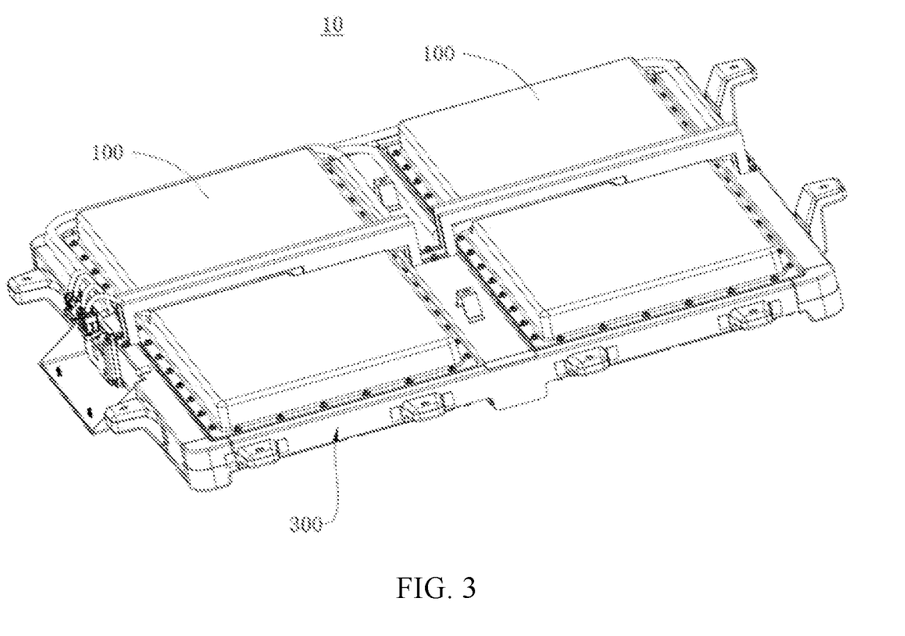
FIG. 3 is a schematic diagram of a battery assembly provided in an embodiment of the present application.

In some embodiments, as shown in FIG. 2 and FIG. 3, the power consumption device 1 may further include a support 300, the support 300 is mounted to the power consumption device body, the battery 100 is mounted to the support 300, and the battery 100 is mounted to the power consumption device body through the support 300. The battery 100 and the support 300 constitute a battery assembly 10.

Figure 4:
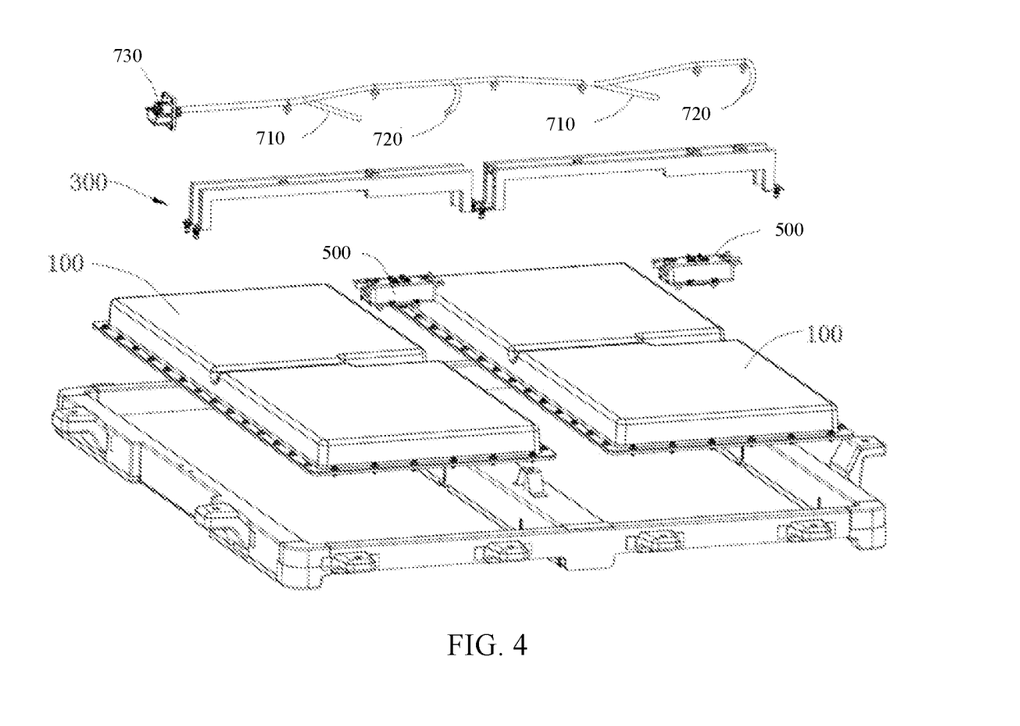
FIG. 4 is an exploded view of the battery assembly provided in FIG. 3.

As shown in FIG. 4, the battery assembly 10 further includes a second connector 500, the second connector 500 is mounted to the support 300, and the second connector 500 is configured to be butted with the battery 100. When the first connector 130 is butted with the second connector 500, the electric energy of the battery 100 may be transferred to the power consumption device body through the first connector 130 and the second connector 500.

As shown in FIG. 4, the battery assembly 10 further includes a first conductive member 710, a second conductive member 720 and a butting terminal 730. One end of the first conductive member 710 and one end of the second conductive member 720 are both connected to the second connector 500. Another end of the first conductive member 710 and another end of the second conductive member 720 are both connected to the butting terminal 730, and the butting terminal 730 is directly or indirectly connected to the power consumption device body.

Figure 5:
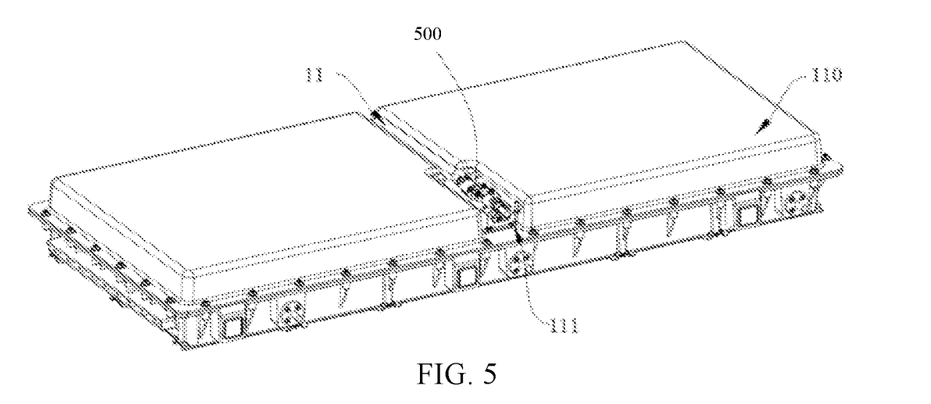
FIG. 5 is a schematic diagram of butting between a second connector and a battery provided in an embodiment of the present application.
Figure 6:
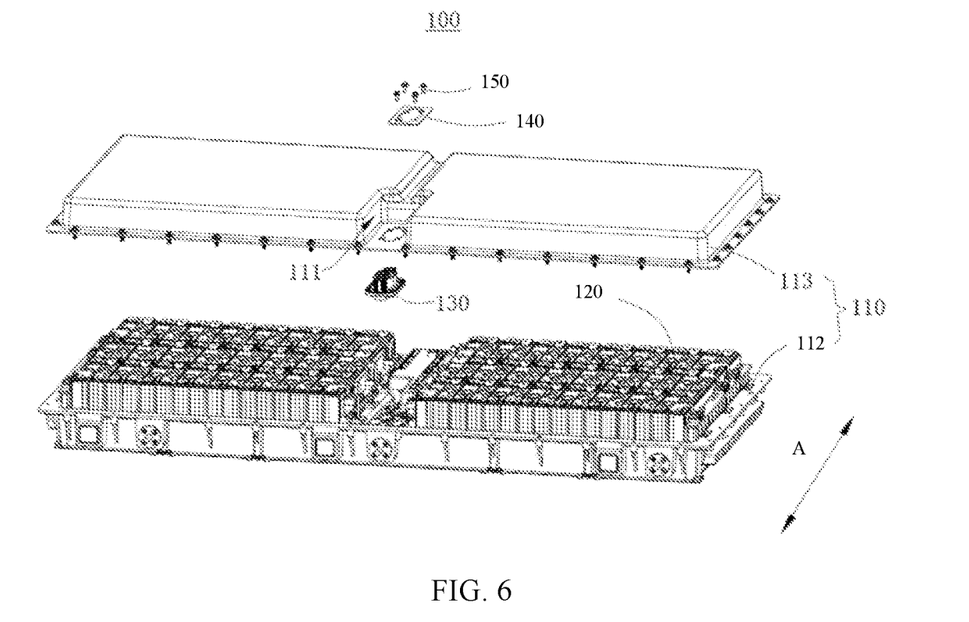
FIG. 6 is an exploded view of a battery provided in an embodiment of the present application.

As shown in FIG. 5 and FIG. 6, in some embodiments, an outer surface of the box 110 is provided with a groove 111 recessed towards the inner side of the box 110, and the first connector 130 is disposed in the groove 111. After the second connector 500 is butted with the first connector 130, the second connector 500 is at least partially located in the groove 111.

The provision of the groove 111 could leave space for the butting between the first connector 130 and the second connector 500, the second connector 500 on the support 300 is butted with the first connector 130 at the position of the groove 111, and the second connector 500 is partially or completely located in the groove 111, which could reduce a distance between the battery 100 and the power consumption device body, so that the battery 100 is closer to the power consumption device body, and could reduce mounting space required for mounting the batter 100 to the power consumption device body, so that the structure of the power consumption device 1 is more compact, and the arrangement of other components of the power consumption device 1 is not affected.

Figure 7:
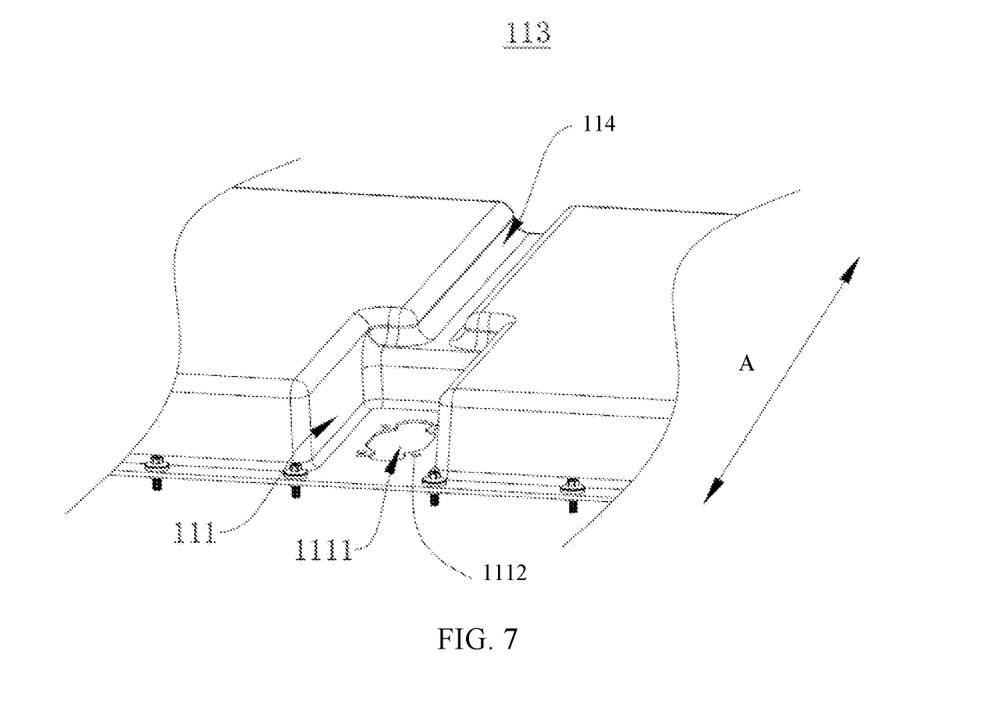
FIG. 7 is a schematic diagram of an upper cover body provided in an embodiment of the present application.

As shown in FIG. 6 and FIG. 7, in some embodiments, the box 110 includes a lower housing 112 and an upper cover body 113, the battery cell 120 is disposed in the lower housing 112, the upper cover body 113 covers and engages with the lower housing 112, the groove 111 is formed on an outer surface of the upper cover body 113 and the outer surface of the upper cover body 113 is recessed downward, and the groove 111 penetrates one side of the upper cover body 113 in a first direction A. The box 110 is in a split structure, which facilitates the mounting of the battery cell 120 and other components inside the box 110, and facilitates manufacturing and molding of the box 110.

In some embodiments, the first connector 130 is disposed on a bottom wall of the groove 111, so that the first connector 130 is located at the deepest position of the groove 111. When the second connector 500 is butted with the first connector 130, the second connector 500 could be located in the groove 111 to the maximum extent, which further reduces the mounting space required for mounting the battery 100 to the power consumption device body, so that the structure of the power consumption device 1 is more compact.

Certainly, in some embodiments, the first connector 130 may be disposed on a side wall of the groove 111.

In some embodiments, the bottom wall of the groove 111 is provided with a first opening 1111, and the first connector 130 passes through the first opening 1111 to output electric energy of the battery cell 120 to an outside of the box 110 through the first connector 130. The first connector 130 passes through the first opening 1111 to facilitate simultaneous connection to the second connector 500 and the battery cell 120 inside the box 110, so that the first connector 130 has one portion located in the groove 111 and the other portion accommodated in the box 110, which reduces the occupation of space of the groove 111 by the first connector 130 to leave much space for the second connector 500, so that the second connector 500 could be located in the groove 111 to the maximum extent as much as possible, and further, the structure of the power consumption device 1 is more compact.

The first connector 130 passes through the first opening 1111 from the inner side of the box 110. Moreover, the first connector 130 covers the first opening 1111 and is hermetically connected to the box 110 to close the first opening 1111. The first connector 130 covers and seals the first opening 1111, which could prevent rainwater, dust in the air and the like from entering the box 110 from the first opening 1111 and damaging the components inside the box 110.

The outer surface of the upper cover body 113 of the box 110 is further provided with a guiding groove 114 recessed towards the inner side of the box 110, the guiding groove 114 is in communication with the groove 111, and the guiding groove 114 extends along a first direction A of the upper cover body 113 and penetrates one side of the upper cover body 113 far away from the groove 111 in the first direction A. A height position of the bottom wall of the groove 111 is lower than a height position of a bottom wall of the guiding groove 114, which facilitates the placement of a conductive wire connected between the second connector 500 and the power consumption device body.

To ensure a stable and reliable connecting relationship between the first connector 130 and the box 110, in this embodiment, the battery 100 further includes a fixing member 150, and the fixing member 150 is configured to pass through a first through hole 1112 on the bottom wall of the groove 111 to be connected to the first connector 130. The fixing member 150 may be a bolt, a screw, or the like. The first connector 130 is fixed to the box 110 through the fixing member 150, so that the first connector 130 does not move relative to the box 110, and stable connecting relationships between the first connector 130 and the battery cell 120 and between the first connector 130 and the second connector 500 could be maintained.

Figure 8:
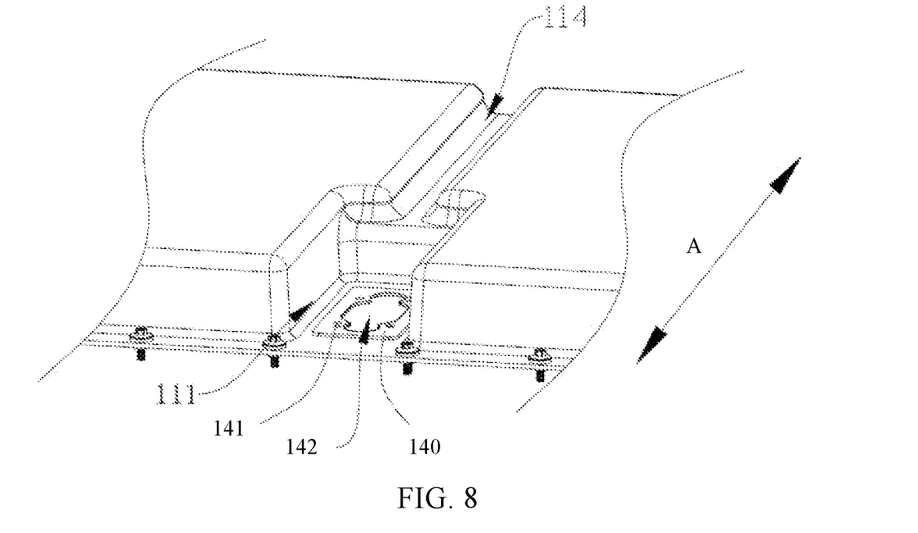
FIG. 8 is a schematic diagram of a reinforcing plate being disposed in a groove provided in an embodiment of the present application.

In this embodiment, as shown in FIG. 8, the battery 100 further includes a reinforcing plate 140, the reinforcing plate 140 is disposed on the bottom wall of the groove 111, the reinforcing plate 140 is provided with a second through hole 141 and a second opening 142 for the first connector 130 to pass through, the first opening 1111 is aligned with the second opening 142, a first connecting end 132 and a first guiding part 133 passes through the first opening 1111 and the second opening 142 in sequence. The second through hole 141 is aligned with the first through hole 1112, the fixing member 150 passes through the second through hole 141 and the first through hole 1112 in sequence to be connected to the first connector 130, so as to fix the reinforcing plate 140 and the first connector 130 to the box 110. The reinforcing plate 140 may increase the force-receiving area and ensure the hermetic seal of the entire surface.

In addition, the provision of the reinforcing plate 140 could further improve stability of the connection between the first connector 130 and the box 110, and the reinforcing plate 140 could withstand the impact when the second connector 500 on the power consumption device 1 is butted with the first connector 130. Moreover, the bottom wall of the groove 111 is drilled with the first opening 1111, so that the strength of the bottom wall of the groove 111 is reduced, thereby reducing bearing capacity of the bottom wall of the groove 111. The provision of the reinforcing plate 140 could compensate for the defect of reduction of the bearing capacity caused by drilling the first opening 1111 on the bottom wall of the groove 111.

In this embodiment, there are a plurality of first through holes 1112, each of the first through holes 1112 is arranged at intervals along an edge of the first opening 1111, the reinforcing plate 140 is drilled with a plurality of second through holes 141, and the second through holes 141 are arranged in one-to-one correspondence to the first through holes 1112, the first through holes 1112 are arranged in one-to-one correspondence to mounting holes on the first connector 130, and each second through hole 141 and each corresponded first through hole 1112 and each mounting hole on the first connector 130 is passing throughly provided with one fixing member 150, so that the first connector 130, the box 110 and the reinforcing plate 140 have multiple junctions to ensure uniform and stable connections and improve capacities of vibration resistance and impact resistance. In addition, the fixing member 150 fixes the reinforcing plate 140 and the first connector 130 to the box 110 simultaneously, which could reduce the number of fixing members 150 and the weight of the battery 100, save the costs, and reduce the difficulty of assembly of the battery 100.

Figure 9:
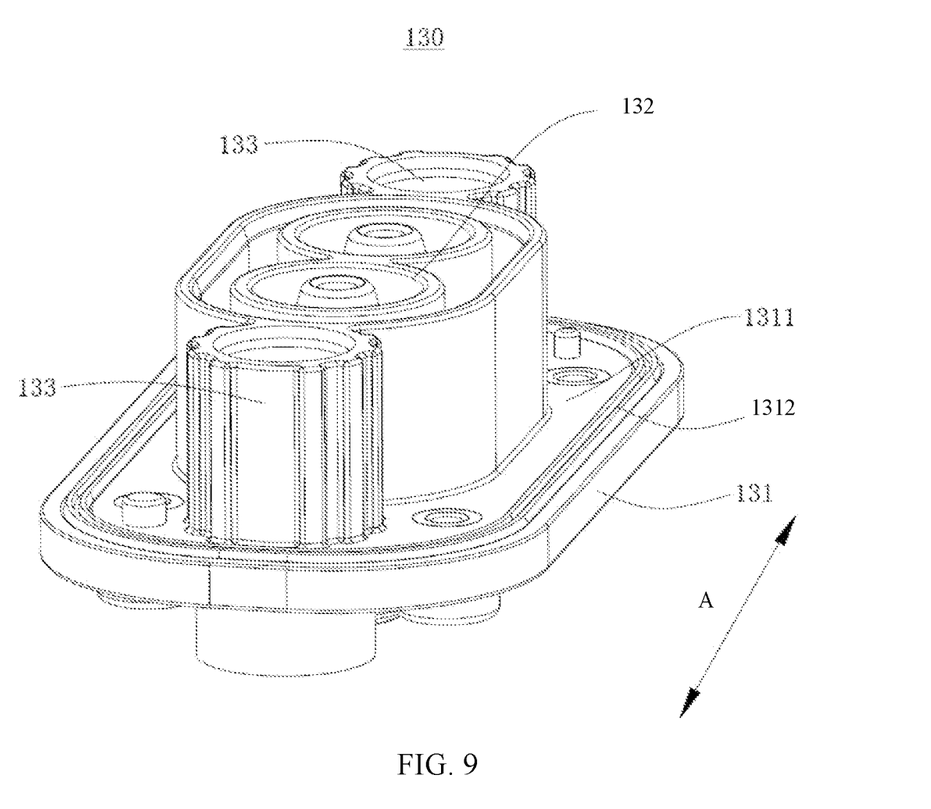
FIG. 9 is a schematic diagram of a first connector provided in an embodiment of the present application.

As shown in FIG. 9, the first connector 130 includes a base 131 and a connecting end 132, the first connecting end 132 is connected to the base 131, the base 131 has a first surface 1311, and one end of the first connecting end 132 is connected to the first surface 1311 of the base 131. The base 131 covers the first opening 1111 from an inner side of the box 110, the first surface 1311 of the base 131 faces the first opening 1111, and the first connecting end 132 is disposed on the first surface 1311 and passes out from the first opening 1111.

The base 131 covers the first opening 1111 from the inner side of the box 110, which has a sealing effect on the first opening 1111. After the second connector 500 is butted with the first connector 130, the base 131 can prevent the first connector 130 from moving along a direction approaching the second connector 500, avoiding the second connector 500 pulling off the first connector 130 which may cause an electrical disconnection between the first connector 130 and the battery cell 120.

In this embodiment, the first surface 1311 of the base 131 of the first connector 130 is provided with a sealing groove 1312, the sealing groove 1312 is arranged surrounding the first opening 1111, the contour of the sealing groove 1312 matches the contour of the base 131, and a sealing member is disposed in the sealing groove 1312, so that the sealing member is arranged surrounding the first opening 1111. When the first connector 130 passes through the first opening 1111, the sealing member tightly abuts a lower surface of the upper cover body 113 from bottom to top to realize sealing between the first connector 130 and the box 110. The sealing member is disposed in the box 110, which could avoid sealing failure caused by external wear, corrosion and the like. In addition, the sealing member is disposed in the box 110, which avoids the sealing member to occupy the space of the groove 111, so that the groove 111 can leave much more space for the butting between the second connector 500 and the first connector 130. The sealing member has better sealing performance since it is arranged surrounding the first opening 1111.

In some embodiments, the sealing groove 1312 may be arranged on an inner surface of the upper cover body 113, and the sealing member is disposed in the sealing groove 1312 of the upper cover body 113. When the first connector 130 passes through the first opening 1111, the first connector tightly abuts the sealing member from bottom to top to realize the sealing between the first connector 130 and the box 110. The material of the sealing member may be nitrile rubber, silica gel, nylon, or the like.

In some embodiments, the first connector 130 and the box 110 may be hermetically connected in other manners.

The first connecting end 132 is provided with a positive terminal and a negative terminal, and the first connecting end 132 passes through a first opening 1111, so that the positive terminal and the negative terminal of the first connector 130 could be butted with the second connector 500, respectively.

The first connector 130 is further provided with a first guiding part 133, the first guiding part 133 is connected to the base 131 of the first connector 130, and the first guiding part 133 is configured to guide the second connector 500 when the first connector 130 is butted, so as to align a position of the second connector 500 with that of the first connector 130. The provision of the first guiding part 133 could ensure an accurate butting between the first connector 130 and the second connector 500. There are two first guide parts 133, and the two first guide parts 133 are spaced apart along the first direction A.

Figure 10:
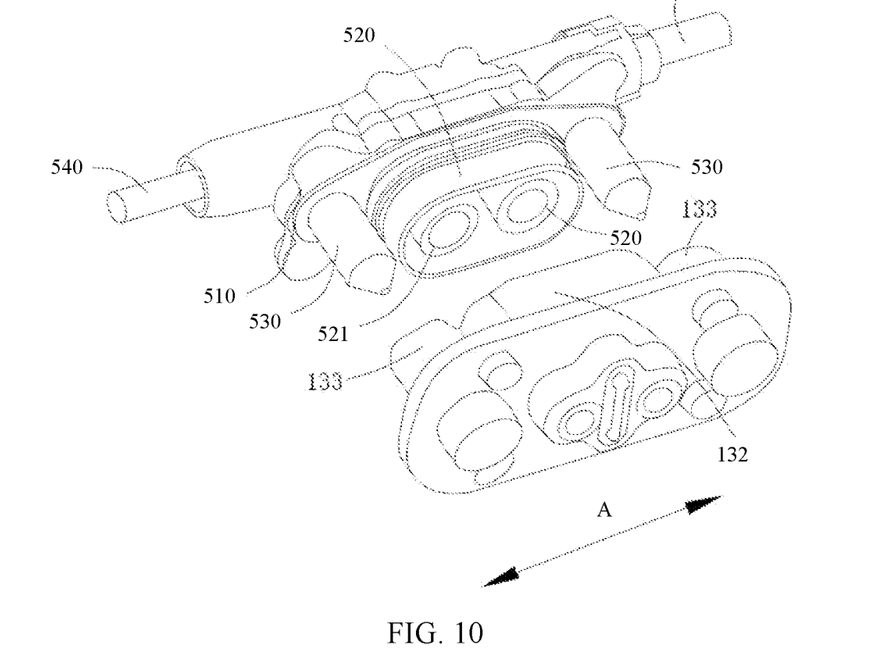
FIG. 10 is a schematic diagram of a first connector and a second connector provided in an embodiment of the present application.

As shown in FIG. 10, the second connector 500 includes a substrate 510, a second connecting end 520 and a second guiding part 530, and the second connecting end 520 and the second guiding part 530 are connected to the substrate 510. There are two second guiding parts 530, the two second guiding parts 530 are spaced apart on two sides of the second connecting end 520 along a first direction A.

The first guiding part 133 is configured to be mated with the second guiding part 530 when the first connector 130 is butted with the second connector 500 to guide the first connector 130, so as to align the position of the second connector 500 with that of the first connector 130. The first connector 130 and the second connector 500 are guided to be butted with each other by the mating of the first guiding parts 133 and the second guiding parts 530, which could improve accuracy of the butting between the first connector 130 and the second connector 500.

The first guiding part 133 is a guiding sleeve, and the second guiding part 530 is a guiding pillar. The first connector 130 and the second connector 500 are guided to be butted with each other by the mating of the guiding sleeve and the guiding pillar, which is simple in implementation and high in reliability. There are two first guiding parts 133, the two guiding parts 133 are located on two sides of the first connecting end 132 along a first direction A, respectively. There are two second guiding parts 530, and the second guiding parts 530 are arranged in one-to-one correspondence to the first guiding parts 133.

In some embodiments, the first guide part 133 may also be guiding pillar, and the second guide part 530 may also be guiding sleeve.

In some embodiments, the second connector 500 is floatingly mounted to the support 300. For example, the substrate 510 and the support 300 are connected through an elastic member (not shown), and the extension, compression or torsion of the elastic member allows the second connector 500 to have a certain floating range relative to the support 300, which avoids the case that the second connector 500 and the battery 100 cannot be accurately butted in place caused by manufacturing or mounting errors during the butting process between the second connector 500 and the battery 100. The floating mounting of the second connector 500 to the support 300 may also enable the first guiding parts 133 and the second guiding parts 530 to be mated in a case when the first connector 130 and the second connector 500 have a certain mounting or manufacturing error, realizing an accurate butting between the first connector 130 and the second connector 500.

With continuous reference to FIG. 10, the second connector 500 further includes a first wire 540 and a second wire 550, the second connecting end 520 includes a first terminal 521 and a second terminal 522 with opposite polarities, one end of the first wire 540 is connected to the first terminal 521, one end of the second wire 550 is connected to the second terminal 552, and the first wire 540 and the second wire 550 extend from two opposite sides of the substrate 510 along the first direction A, respectively. The first wire 540 and the second wire 550 extend from two sides of the substrate 510 along a first direction A, respectively, so that the second connector 500 has a smaller size in a second direction B.

One end of the first wire 540 extending out of the substrate 510 is connected to the first conductive member 710, and one end of the second wire 550 extending out of the substrate 510 is connected to the second conductive member 720.

In some embodiments, the first conductive member 710 and the first wire 540 may be an integral structure, and the second conductive member 720 and the second wire 550 may be an integral structure.

The direction of the position at which the battery 100 is butted with the second connector 500 is different according to a different orientation of the second connector 500. For example, in some embodiments, the support 300 is connected to the bottom of the vehicle body, and the second connecting end 520 is disposed to face the battery 100 along a direction of gravity, so that the battery 100 may be butted with the second connector 500 along a direction opposite to the direction of gravity to realize an electrical connection between the battery 100 and the second connector 500. In this way, a damage to the first connector 130 and/or the second connector 500 due to the gravity of the battery 100 may be avoided and the use of the battery 100 or the power consumption device 1 may not be affected. During the mounting of the battery 100, it is only necessary to push the battery 100 moving along a direction opposite to the direction of gravity, so that the first connector 130 can be butted with the second connector 500, which is convenient and quick.

In some embodiments, the second connecting end 520 may be arranged in other directions, and correspondingly, the first connector 130 is butted with the second connector 500 in a direction opposite to the orientation of the second connecting end 520.

The structure of the support 300 will be described in detail below with reference to FIG. 11.

Figure 11:
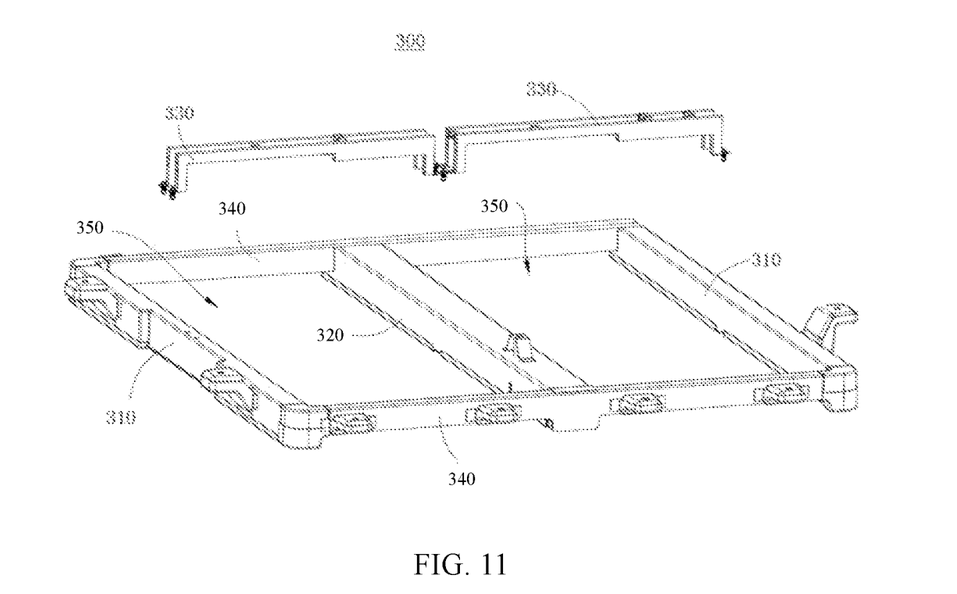
FIG. 11 is a schematic diagram of a support body provided in an embodiment of the present application.

As shown in FIG. 11, the support 300 includes a first beam 310, a second beam 320 and a fixing frame 330, the first beam 310 and the second beam 320 are arranged opposite to each other, and accommodating space 350 for accommodating the battery 100 is formed between the first beam 310 and the second beam 320.

The support 300 further includes a third beam 340, and the third beam 340 is connected to the first beam 310 and the second beam 320. In this embodiment, the number of third beams 340 is two, and the two third beams 340 are arranged opposite to each other. The provision of the third beam 340 allows the structure of the support 300 to have better stability, which is beneficial to the stable mounting of the battery 100.

The number of first beams 310 is two, the number of second beams 320 is one, the two first beams 310 are arranged opposite to each other, the two first beams 310 and the one third beam 340 are connected, and the second beam 320 is located between the two first beams 310 to form two accommodating spaces 350, and each accommodating space 350 is correspondingly provided with a second connector 500. Two ends of the second beam 320 are connected to the two third beams 340, respectively. The second beam 320, the two first beams 310 and the two third beams 340 jointly form two accommodating spaces 350 of rectangular shape. The two accommodating spaces 350 share a second beam 320.

The support 300 forms two accommodating spaces 350 through the second beam 320, which could accommodate two batteries 100. The two batteries 100 may provide a large amount of electric energy for the power consumption device 1 to ensure a normal operation of the power consumption device 1, or one of the two batteries 100 serves as a backup power source, so that the power consumption device 1 could operate continuously and stably for a long time.

Each accommodating space 350 is correspondingly provided with a fixing frame 330, the second connector 500 is mounted to the fixing frame 330, and the second connecting end 520 is disposed to face the battery 100 along a direction of gravity, so that the battery 100 may be butted with the second connector 500 along a direction opposite to the direction of gravity to realize an electrical connection between the battery 100 and the second connector 500. Each fixing frame 330 is correspondingly provided with a second connector 500, so that the battery 100 in each accommodating space 350 has a second connector 500 butted with.

The battery 100, the battery assembly 10 and the power consumption device 1 according to the embodiments of the present application are described above. A producing method and apparatus of a battery according to the embodiments of the present application will be described below, and for the specific structures that are not described in detail, reference is made to the foregoing embodiments.

Figure 12:
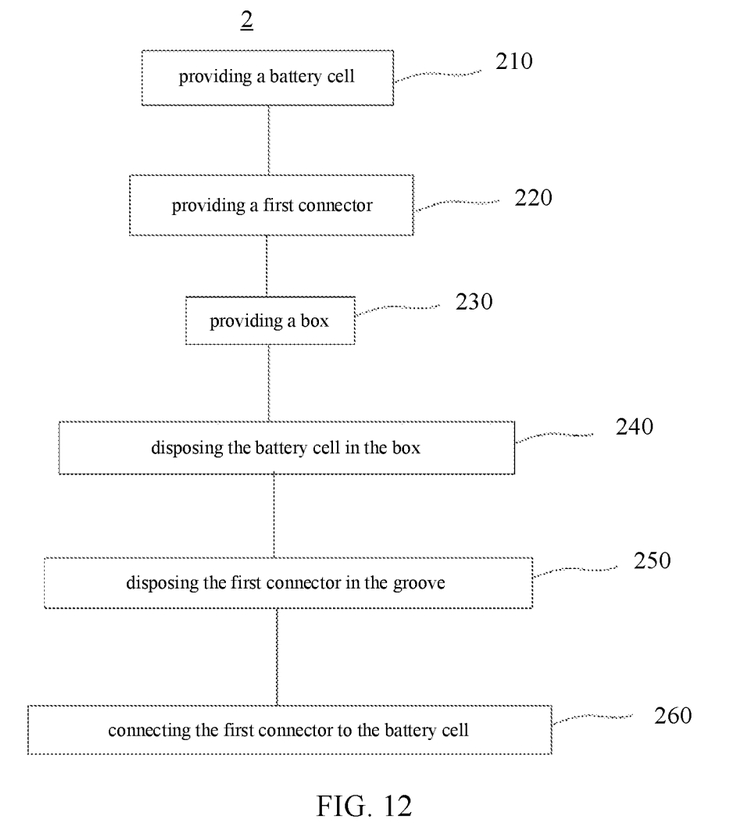
FIG. 12 is a schematic flowchart of a producing method of a battery provided in an embodiment of the present application.

As shown in FIG. 12, an embodiment of the present application provides a producing method 2 of a battery, and the producing method 2 of a battery includes:

210, providing a battery cell 120;

220, providing a first connector 130;

230, providing a box 110, an outer surface of the box 110 being provided with a groove 111;

240, placing the battery cell 120 in the box 110;

250, disposing the first connector 130 in the groove 111; and

260, connecting the first connector 130 to the battery cell 120 to output electric energy of a battery 100.

Figure 13:
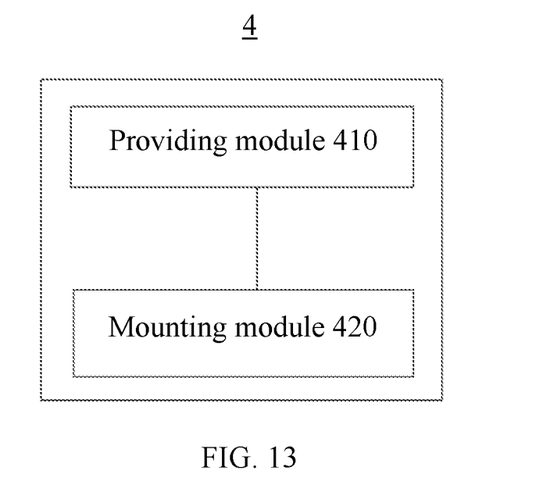
FIG. 13 is a schematic block diagram of a producing apparatus of a battery provided in an embodiment of the present application.

As shown in FIG. 13, an embodiment of the present application provides a producing apparatus 4 of a battery, and the producing apparatus 4 of a battery includes:

a providing module 410 configured to: provide a battery cell 120; provide a first connector 130; and provide a box 110, an outer surface of the box 110 being provided with a groove 111; and a mounting module 420 configured to: dispose the battery cell 120 in the box 110; dispose the first connector 130 in the groove 111; and connect the first connector 130 to the battery cell 120 to output electric energy of a battery 100.

Although the present application has been described with reference to the preferred embodiments thereof, various modifications can be made thereto without departing from the scope of the present application, and the components therein can be replaced with equivalents. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, configured for a vehicle, and comprising:
    a box;
    a battery cell disposed in the box; and
    a first connector electrically connected to the battery cell to output electric energy of the battery;
    wherein the first connector is configured to transfer electric energy from the battery to the vehicle when butted with a second connector of the vehicle;
    wherein an outer surface of the box is provided with a groove, and the first connector is disposed in the groove, so that the second connector of the vehicle is at least partially located in the groove when butted with the first connector;
    wherein a bottom wall of the groove is provided with a first opening, and the first opening is configured for the first connector to pass through to output electric energy of the battery cell to an outside of the box through the first connector.

2. The battery according to claim 1, wherein the first connector is disposed on the bottom wall of the groove.

3. The battery according to claim 2, wherein the battery further comprises:
    a fixing member, the fixing member being configured to pass through a first through hole provided on the bottom wall of the groove to be connected to the first connector, so as to fix the first connector to the box.

4. The battery according to claim 3, wherein the battery further comprises:
    a reinforcing plate, the reinforcing plate being disposed on the bottom wall of the groove and fixed to the box, and the reinforcing plate being provided with a second opening configured for the first connector to pass through.

5. The battery according to claim 4, wherein the reinforcing plate is provided with a second through hole, and the fixing member is configured to pass through the second through hole and the first through hole in sequence to be connected to the first connector, so as to fix the reinforcing plate and the first connector to the box.

6. The battery according to claim 1, wherein the first connector covers the first opening and is hermetically connected to the box to close the first opening.

7. The battery according to claim 6, wherein the first connector comprises a base and a first connecting end, the base covers the first opening from an inner side of the box, a first surface of the base faces the first opening, and the first connecting end is disposed on the first surface and passes out from the first opening.

8. The battery according to claim 7, wherein the battery further comprises:
a sealing member, the sealing member being disposed between the first surface and an inner surface of the box and surrounding the first opening, and configured to realize hermetic connection between the first connector and the box.

9. The battery according to claim 1, wherein the first connector is provided with a first guiding part, and the first guiding part is configured to guide the second connector when the first connector is butted with the second connector, so as to align a position of the second connector with that of the first connector.

10. The battery according to claim 1, wherein the box comprises a lower housing and an upper cover body, the battery cell is disposed in the lower housing, the upper cover body covers and engaged with the lower housing, the groove is provided on the upper cover body, and the groove is recessed downwards from an outer surface of the upper cover body.

11. A battery assembly, comprising:
a support configured to be mounted to a vehicle body; and
the battery according to claim 1, the battery being mounted to the support.

12. The battery assembly according to claim 11, wherein the battery assembly further comprises:
the second connector mounted to the support, and configured to be butted with the first connector of the battery.

13. The battery assembly according to claim 12, wherein the second connector comprises a second connecting end, and the second connecting end is disposed facing towards the battery along a direction of gravity, so that the first connector is capable of being butted with the second connector along a direction opposite to the direction of gravity.

14. The battery assembly according to claim 11, wherein the second connector is floatingly mounted to the support.

15. The battery assembly according to claim 14, wherein the first connector is provided with a first guiding part, the second connector is provided with a second guiding part, and the first guiding part is configured to be mated with the second guiding part when the first connector is butted with the second connector to guide the second connector, so as to align a position of the second connector with that of the first connector.

16. The battery assembly according to claim 15, wherein one of the first guiding part and the second guiding part is a guiding sleeve, and the other is a guiding pillar.

17. A producing apparatus of a battery, wherein the battery is configured for a vehicle, comprising:
a providing module configured to:
provide a battery cell;
provide a first connector; and
provide a box, an outer surface of the box being provided with a groove, and a bottom wall of the groove is provided with a first opening; and
a mounting module configured to:
dispose the battery cell in the box;
dispose the first connector in the groove;
connect the first connector to the battery cell to output electric energy of the battery; and
connect the first connector to a second connector of the vehicle to transfer electric energy from the battery to the vehicle;
wherein the first opening is configured for the first connector to pass through to output electric energy of the battery cell to an outside of the box through the first connector.

\* \* \* \* \*